United States Patent [19]

Saathoff

[11] Patent Number: 5,306,066
[45] Date of Patent: Apr. 26, 1994

[54] ENERGY ABSORBING VEHICLE DOORS

[75] Inventor: Donald G. Saathoff, Canton, Mich.

[73] Assignee: Ford Motor Company, Dearborn, Mich.

[21] Appl. No.: 961,303

[22] Filed: Oct. 15, 1992

[51] Int. Cl.$^5$ ............................................. B60R 21/04
[52] U.S. Cl. ................................ 296/146.6; 296/189; 188/377; 280/751
[58] Field of Search ................ 296/189, 146; 188/377; 280/751

[56] References Cited

U.S. PATENT DOCUMENTS

| | | | |
|---|---|---|---|
| 3,744,835 | 7/1973 | Carbone et al. | 188/377 |
| 3,834,482 | 9/1974 | Wada et al. | 180/90 |
| 4,272,103 | 6/1981 | Schmid et al. | 280/751 |
| 4,348,442 | 9/1982 | Figge | 428/72 |
| 4,500,583 | 2/1985 | Naul | 428/116 |
| 4,890,877 | 1/1990 | Ashtiani-Zarandi et al. | 296/146 |
| 4,948,196 | 8/1990 | Baba et al. | 296/188 |
| 5,102,163 | 4/1992 | Ishikawa | 280/751 |

OTHER PUBLICATIONS

Honeycomb Brochure, by Hexcel, 1988.
Honeycomb TSB 120 Mechanical Properties of Hexcel Honeycomb Materials, by Hexcel, 1990.

Primary Examiner—Robert R. Song
Attorney, Agent, or Firm—Daniel M. Stock; Roger L. May

[57] ABSTRACT

A vehicle door includes an inner panel, an outer panel joined to the inner panel and a door trim panel mounted on the inner panel to form a space therebetween. The vehicle door also includes a honeycomb shaped energy absorbing structure disposed in the space between the door trim panel and the inner panel for absorbing energy from a side collision type impact of the vehicle door.

20 Claims, 3 Drawing Sheets

5,306,066

ENERGY ABSORBING VEHICLE DOORS

BACKGROUND OF THE INVENTION

1. Field of the Invention

The present invention relates generally to doors for vehicles and, more specifically, to an energy absorbing door for a vehicle.

2. Description of the Related Art

It is known to construct doors for vehicles such as automotive vehicles. Typically, the door includes an inner and outer panel joined to each other and connected to vehicle structure in a known manner. The vehicle door also includes a decorative door trim panel mounted on the inner panel.

It is also known that vehicles may collide with obstacles during operation. As a result, automotive vehicles have provided various structures to lessen the effects of a collision type impact on an occupant compartment of the vehicle. For example, some automotive vehicles include an air bag to lessen the effects of a frontal collision type impact. As to a side collision type impact, some automotive vehicles include foam material or cone shaped structures for the vehicle door. While these approaches provide a distinct advantage in lessening the effects on the occupant compartment during a collision, they suffer from the disadvantage that they cannot be tuned to meet side collision type impact requirements. Another disadvantage is that they suffer from a relatively high weight and cost for a vehicle door.

SUMMARY OF THE INVENTION

Accordingly, the present invention is a vehicle door including an inner panel, an outer panel joined to the inner panel and a door trim panel mounted on the inner panel to form a space therebetween. The vehicle door also includes a honeycomb shaped energy absorbing structure disposed in the space between the door trim panel and the inner panel for absorbing energy from a side collision type impact of the vehicle door.

One advantage of the present invention is that a vehicle door incorporates an energy absorbing structure to lessen the effects of a side collision type impact. Another advantage of the present invention is that the vehicle door incorporates an energy absorbing structure which is honeycomb shaped. Yet another advantage of the present invention is that the vehicle door includes a honeycomb shaped energy absorbing structure disposed between the door trim panel and inner door panel. Still another advantage of the present invention is that the honeycomb shaped energy absorbing structure can be tuned to meet side collision type impact requirements. A further advantage of the present invention is that the honeycomb shaped energy absorbing structure is pre-crushed to provide a lower pressure or crush strength. A still further advantage of the present invention is that the honeycomb shaped energy absorbing structure is relatively light weight and low cost compared to conventional foam material and cone shaped structures.

Other objects, features and advantages of the present invention will be readily appreciated as the same becomes better understood after reading the following description taken in light of the accompanying drawings.

DESCRIPTION OF THE PREFERRED EMBODIMENT(S)

Figure 1:
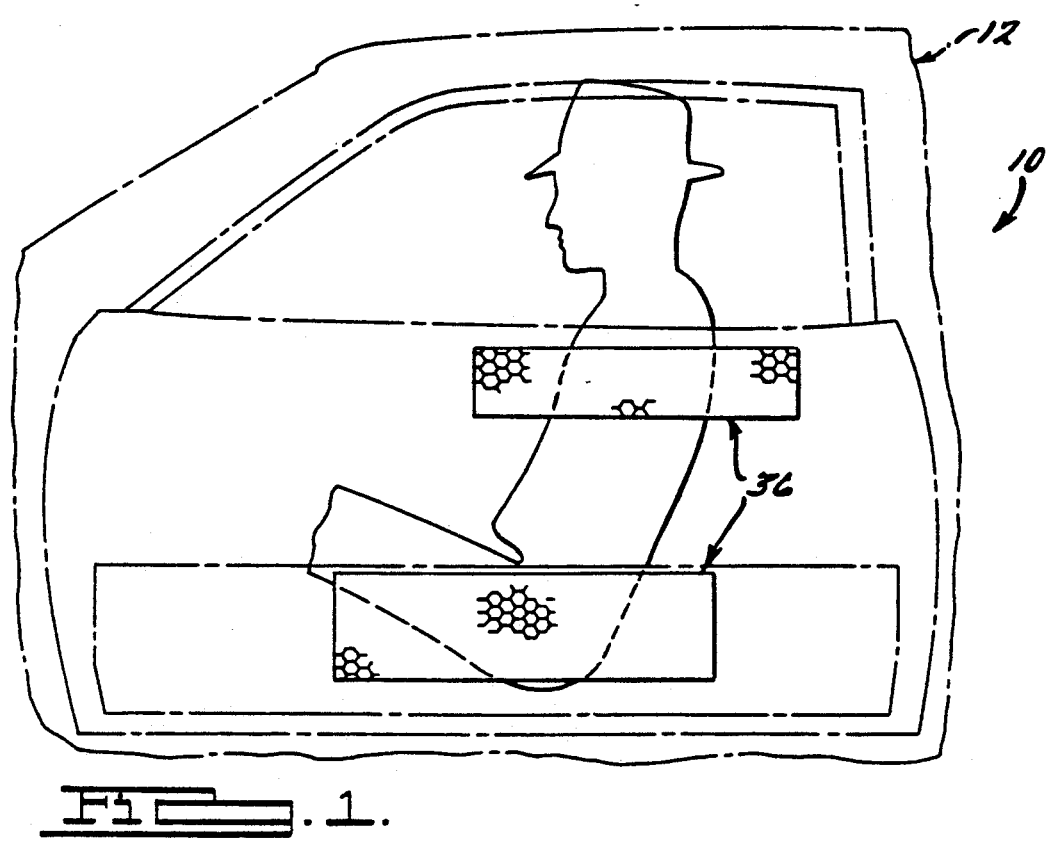
FIG. 1 is a side elevational view of an energy absorbing vehicle door according to the present invention illustrated in operational relationship with a vehicle and occupant.
Figure 2:
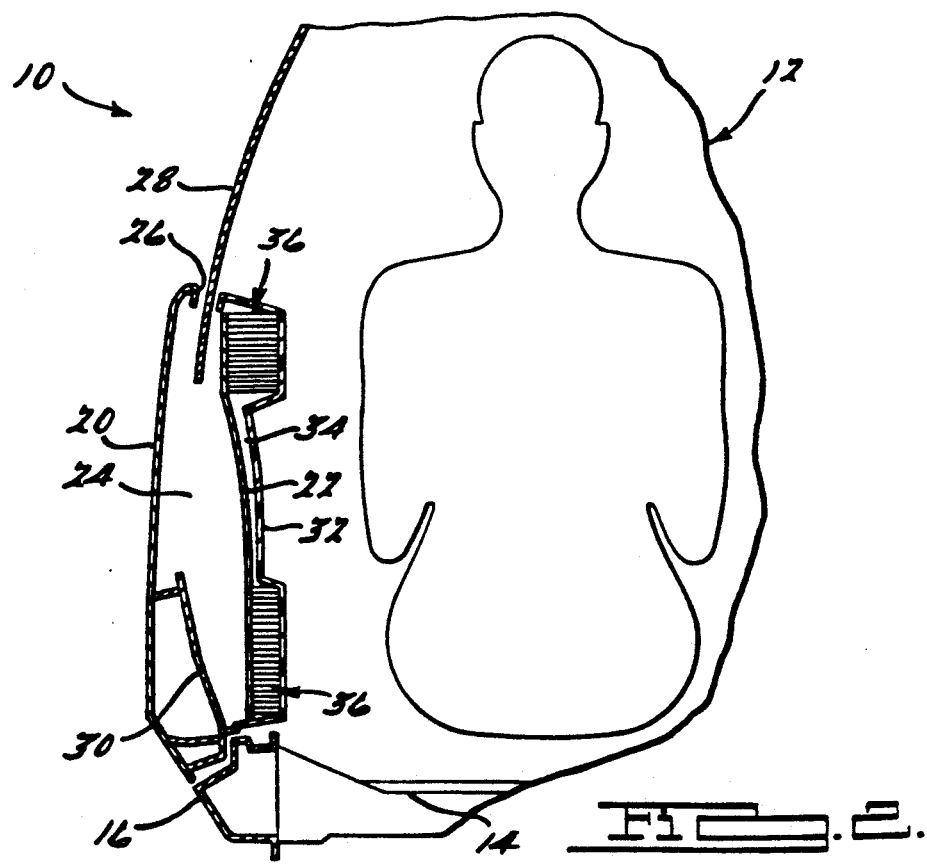
FIG. 2 is a rear elevational view of the energy absorbing vehicle door of FIG. 1.

Turning now to the drawings and in particular FIGS. 1 and 2 thereof, an energy absorbing vehicle door 10 according to the present invention is illustrated in operational relationship with a vehicle 12 such as an automotive vehicle (partially shown) and an occupant of the vehicle 12. The vehicle 12 includes a floor pan 14 and rocker panel 16. It should be appreciated that the floor pan 14 and rocker panel 16 are stationary and connected to the remaining structure of the vehicle 12 as is known in the art. It should also be appreciated that the vehicle door 10 may be moveable and also connected to the remaining structure of the vehicle 12 as is known in the art.

The energy absorbing vehicle door 10 includes an outer panel 20 and an inner panel 22 joined together and forming a space 24 therebetween. The energy absorbing vehicle door 10 also includes an aperture 26 at an upper end for receiving a window 28. The window 28 moves in and out of the space 24 as is known in the art. The energy absorbing vehicle door 10 further includes an intrusion or door guard beam 30 extending longitudinally in the space 24 between the panels 20 and 22 and is secured to the outer panel 20 by suitable means such as welding. It should be appreciated that the energy absorbing vehicle door 10 may include a window regulator device, door latch, and other components of a vehicle door as known in the art.

The energy absorbing vehicle door 10 also includes a door trim panel 32 mounted on the inner panel 22 to form a space 34 therebetween. The door trim panel 32 may be mounted on the inner panel 22 by suitable means such as fasteners (not shown). Preferably, the door trim panel 32 is made of a suitable material such as plastic, cloth, vinyl, leather, carpeting, or a combination thereof. It should be appreciated that the door trim panel 32 may include an arm rest (not shown).

The energy absorbing vehicle door 10 further includes at least one, preferably a pair of energy absorbing structures, according to the present invention and generally indicated at 36. The energy absorbing structures 36 are honeycomb, shaped and disposed in the space 34 between the door trim panel 32 and inner panel 22. Preferably, the energy absorbing structures 36 are mounted to the door trim panel 32 by suitable means such as an adhesive. One energy absorbing structure 36 is located near the aperture 26 and the other energy absorbing structure 36 is located near a lower end of the vehicle door 10. It should be appreciated that the energy absorbing structures 36 provide protection to the shoulder and hip area of the occupant.

Figure 3:
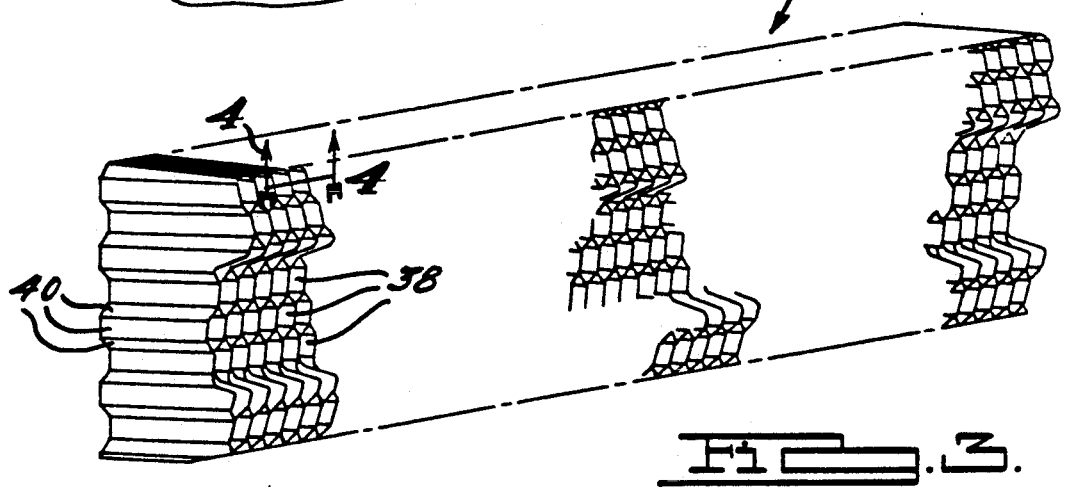
FIG. 3 is a perspective view of an energy absorbing structure of FIGS. 1 and 2.

Referring to FIGS. 1 through 3, the energy absorbing structure 36 includes a plurality of hollow cells 38. The hollow cells 38 have a predetermined shape and a predetermined cell size. For example, the hollow cells 38 are of a hexagonal shape and 0.375 inches in cell size. It should be appreciated that the hollow cells 38 may be of any suitable shape such as circular and any suitable cell size such as 0.25 inches.

The hollow cells 38 are formed by at least one, preferably a plurality of side walls 40 forming open ends. The side walls 40 are elongated in a direction normal to a side collision type impact. The side walls 40 have a predetermined length such as 1.5 inches and a predetermined thickness such as 0.0007 inches. It should be appreciated that the side walls 40 may have any suitable length or thickness.

The energy absorbing structure 36 is made of a suitable material such as metal, plastic, cardboard or the like. Preferably, the material is made of metal such as aluminum or an alloy thereof. For example, the material may be 5052-Al aluminum alloy. It should be appreciated that suitable materials may be used to provide desired tensile and compressive strengths.

The energy absorbing structure 36 may be fabricated by an expansion process. The energy absorbing structure 36 is formed by stacking sheets of web material on which adhesive lines have been printed. The adhesive lines are then cured to form a block. After curing, the block is cut into desired lengths. The block is then expanded as a panel to form the energy absorbing structure 36 as illustrated in FIG. 3. The energy absorbing structure 36 is then tested and tuned to meet predetermined specifications or properties. It should be appreciated that the energy absorbing structure 36 may be formed by any suitable process such as by a corrugated process. It should also be appreciated that such processes are known in the art.

Figure 4:
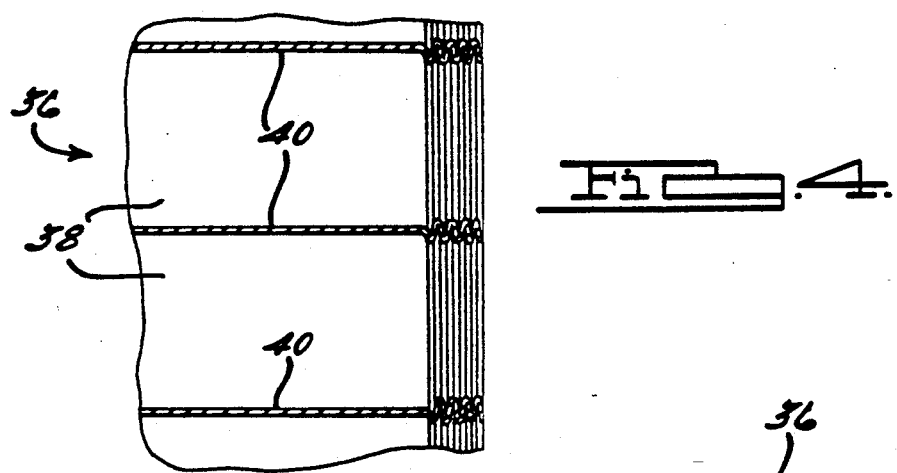
FIG. 4 is a sectional view taken along lines 4—4 of FIG. 3 after pre-crush.

Once expanded, the energy absorbing structure 36 is pre-crushed to remove a material property possessed by honeycombs known as the ultimate compressive strength. Pre-crushing is also used to shape the energy absorbing structure 36 into a desired shape. As illustrated in FIG. 4, the energy absorbing structure 36 is pre-crushed with a suitable device such as a press die (not shown) to deform the side walls 40 of the hollow cells 38 at one end thereof into an accordion shape.

Figure 5:
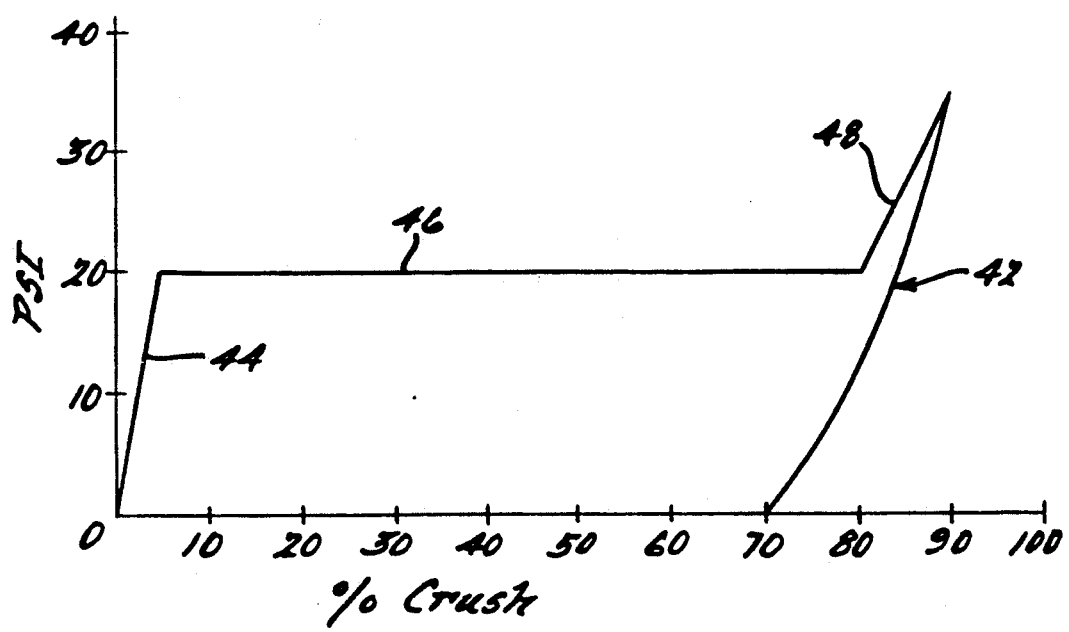
FIG. 5 is a graph of ideal load deflection for the energy absorbing structure of FIGS. 1 and 2.

Referring to FIG. 5, a graph of ideal load deflection is shown for the energy absorbing structure 36. The graph illustrates a load deflection curve, generally indicated at 42, of crush pressure versus percent crush of the energy absorbing structure 36. The ultimate compressive strength property is represented by the first rise 44 shown on the load deflection curve 42. After the first rise 44, the energy absorbing structure 36 continues to deform plastically and uniformly at a constant pressure such as twenty pounds per square inch (20 psi) as represented by the flat portion 46 of the load deflection curve 42. When the energy absorbing structure 36 has been crushed over a predetermined amount such as seventy-five percent (75%), the crush pressure rises as represented by the second rise 48.

Figure 6:
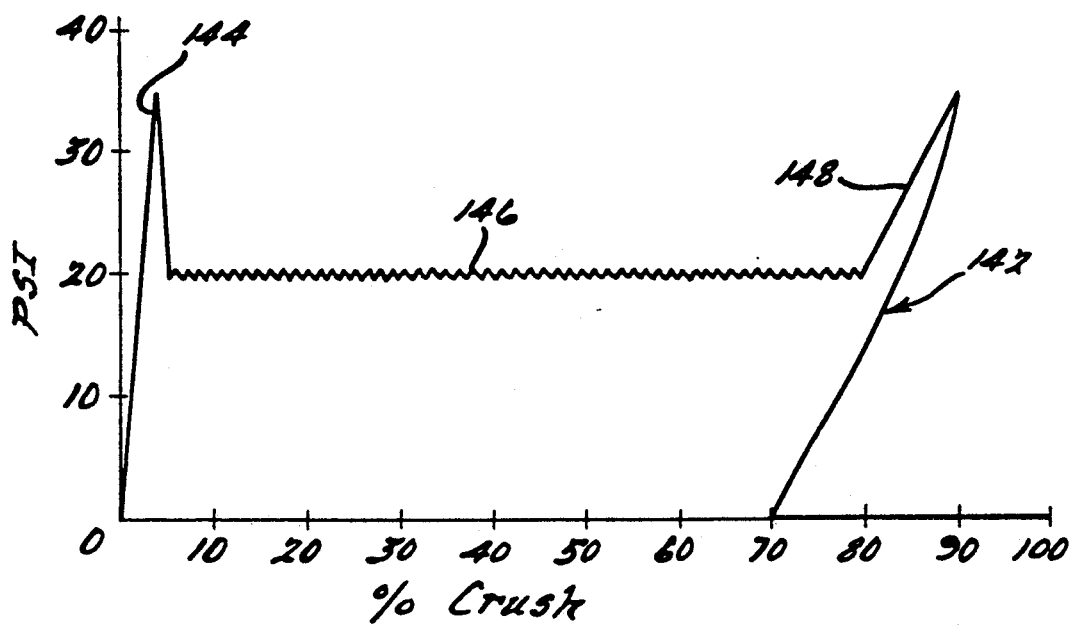
FIG. 6 is a graph of load deflection for the energy absorbing structure of FIGS. 1 and 2 before pre-crush.

Referring to FIG. 6, a graph of load deflection is shown for the energy absorbing structure 36 before pre-crush. Like parts of load deflection curve 42 have like reference numerals increased by one hundred (100).

The load deflection curve 142 has an ultimate compressive strength property represented by the first rise 144 which requires a higher crush pressure than the crush pressure to continue deforming plastically and uniformly at a constant pressure represented by the flat portion 146 of the load deflection curve 142. It should be appreciated that the undulations of crush pressure for the flat portion 146 represent a substantially constant pressure.

Figure 7:
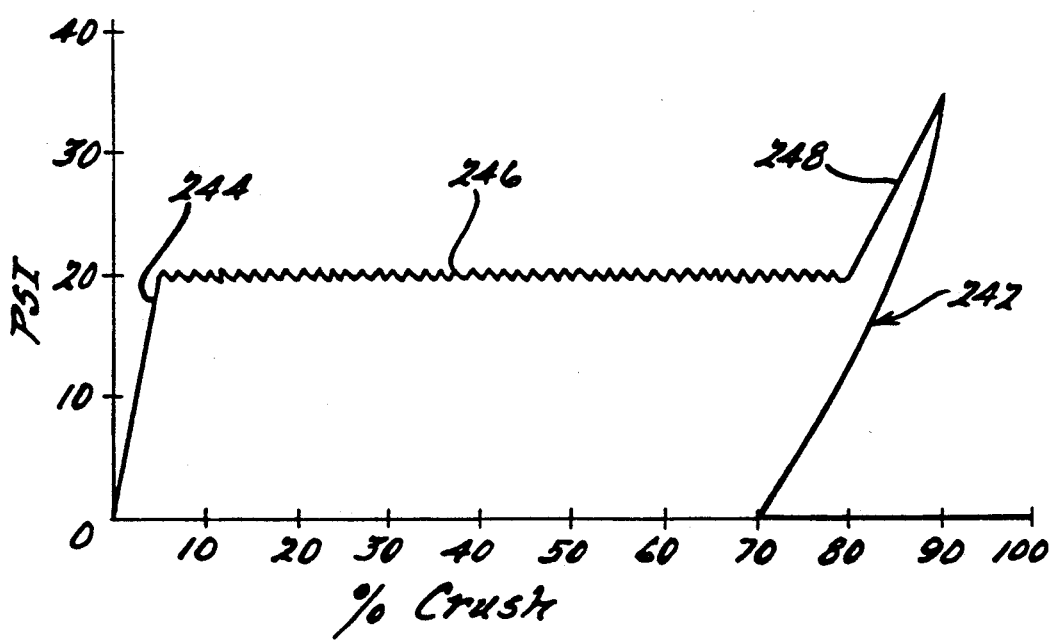
FIG. 7 is a graph of load deflection for the energy absorbing structure of FIGS. 1 and 2 after pre-crush.

Referring to FIG. 7, a graph of load deflection is shown for the energy absorbing structure 36 after pre-crush. Like parts of load deflection curve 42 have like reference numerals increased by two hundred (200). The load deflection curve 242 has a lower ultimate compressive strength property represented by the first rise 244 which is similar to the first rise 44 for the ideal load deflection curve 42. After the first rise 244, the energy absorbing structure 36 continues to deform plastically and uniformly at a constant pressure. It should be appreciated that the undulations of crush pressure for the flat portion 246 represent a substantially constant pressure.

Accordingly, the vehicle door 10 incorporates an energy absorbing structure 36 which can be tuned to meet side collision type impact requirements by changing any on or a combination of: 1) material used; 2) thickness of the material; 3) cell size; and 4) cell shape. The energy absorbing structure 36 is pre-crushed to remove the ultimate compressive strength property, thereby lowering the pressure required to crush the energy absorbing structure 36 upon a side collision type impact. The energy absorbing structure 36 significantly reduces material and tooling costs compared to conventional structures. It should be appreciated that the energy absorbing structure 36 may be disposed between an inner panel and trim panel for body side panels of the vehicle 12.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A vehicle door comprising:
an inner panel;
an outer panel joined to said inner panel;
a door trim panel mounted on said inner panel to form a space therebetween; and
a pre-crushed honeycomb shaped energy absorbing structure disposed in the space between said door trim panel and said inner panel for absorbing energy from a side collision type impact of said vehicle door.

2. A vehicle door as set forth in claim 1 wherein said energy absorbing structure includes a plurality of hollow cells having open ends and interconnected to form a honeycomb.

3. A vehicle door comprising:
an inner panel;
an outer panel joined to said inner panel;
a door trim panel mounted on said inner panel to form a space therebetween;
a honeycomb shaped energy absorbing structure disposed in the space between said door trim panel and said inner panel for absorbing energy from a side collision type impact of said vehicle door;

said energy absorbing structure including a plurality of hollow cells having open ends and interconnected to form a honeycomb; and wherein said energy absorbing structure is pre-crushed to decrease an ultimate strength compressive property of the honeycomb.

4. A vehicle door as set forth in claim 2 wherein said hollow cells are generally hexagonal in shape.

5. A vehicle door as set forth in claim 2 wherein said energy absorbing structure include a plurality of walls forming said hollow cells.

6. A vehicle door as set forth in claim 5 wherein said walls have a predetermined thickness.

7. A vehicle door as set forth in claim 1 wherein said energy absorbing structure is made of an aluminum material.

8. A vehicle door as set forth in claim 1 including means for mounting said energy absorbing structure to said door trim panel.

9. A vehicle door as set forth in claim 8 wherein said mounting means comprises an adhesive.

10. A vehicle door comprising:

an inner panel;

an outer panel joined to said inner panel;

a door trim panel mounted on said inner panel to form a space therebetween; and a honeycomb shaped energy absorbing structure disposed in the space between said door trim panel and said inner panel and having a plurality of pre-crushed walls forming hollow cells orientated at a direction substantially parallel to a side collision type impact of said vehicle door.

11. A vehicle door as set forth in claim 10 wherein said hollow cells have open ends and are interconnected by said side walls to form a honeycomb.

12. A vehicle door comprising:

an inner panel;

an outer panel joined to said inner panel;

a door trim panel mounted on said inner panel to form a space therebetween;

a honeycomb shaped energy absorbing structure disposed in the space between said door trim panel and said inner panel and having a plurality of walls forming hollow cells orientated at a direction substantially parallel to a side collision type impact of said vehicle door; and wherein said walls are partially pre-crushed in a direction parallel thereto.

13. A vehicle door as set forth in claim 10 wherein said hollow cells are generally hexagonal in shape.

14. A vehicle door as set forth in claim 10 wherein said walls have a predetermined thickness.

15. A vehicle door a set forth in claim 10 wherein said hollow cells have a predetermined cell size.

16. A vehicle door as set forth in claim 10 wherein said energy absorbing structure is made of an aluminum material.

17. A vehicle door as set forth in claim 10 including means for mounting said energy absorbing structure to said door trim panel.

18. A vehicle door as set forth in claim 17 wherein said mounting means comprises an adhesive.

19. A vehicle door as set forth in claim 10 including an intrusion beam disposed between said inner panel and said outer panel.

20. A vehicle door comprising:

an inner panel;

an outer panel joined to said inner panel;

a door trim panel mounted on the inner panel to form a space therebetween;

a plurality of walls forming hollow cells having open ends and interconnected to form a honeycomb structure, said walls being partially crushed in a direction parallel thereto, said honeycomb structure being disposed in said space between said door trim panel and said inner panel to absorb energy from a side collision type impact thereof.

* * * * *